United States Patent Office
3,207,703
Patented Sept. 21, 1965

3,207,703
SUPPORTED VANADIUM OXIDE CATALYSTS AND PROCESS FOR PREPARING SAME
William B. Innes, Stamford, Conn., and Richard Duffy, Mount Vernon, N.Y., assignors to American Cyanamid Company, New York, N.Y., a corporation of Maine
No Drawing. Filed Dec. 5, 1961, Ser. No. 157,247
9 Claims. (Cl. 252—455)

This invention relates to catalysts. More particularly, it is concerned with catalysts for use in various hydrocarbon conversion processes. In a more particular aspect, the present invention relates to an alumina supported vanadium oxide catalyst, novel procedures for preparing such catalyst and to the use of the catalyst in the vapor phase oxidation of hydrocarbons.

The advantages of catalysts comprising vanadium oxide supported on various carriers such as alumina, silica, clays and the like in numerous hydrocrabon conversion processes such as oxidation, desulfurization, denitrogenation, hydrogenation, dehydrogenation, reforming, hydroforming, hydrocracking, etc. are well known. Such catalysts are especially valuable because of their resistance to poisoning by sulfur, an attribute which many other types of catalysts employed in hydrocarbon conversion processes do not possess. Other metallic oxide catalysts, e.g., molybdenum oxide, cobalt oxide and nickel oxide catalyts, suffer from the disadvantage of their losing a considerable amount of activity after a given amount of on-stream time and must frequently be regenerated in order to remove sulfur and carbon from the deactivated catalyst. Following successive regeneration, the activity of such catalysts continues to decline and ordinarily they must be discarded. By contrast, however, vanadium oxide catalysts are well known for their retention of activity for long hydrocarbon processing periods, and since they are more stable to heat than other types of metal oxide catalysts, they may be repeatedly regenerated with only an insignificant to moderate loss of initial activity.

However, regenerability and heat stability of vanadium oxide catalysts are largely dependent upon the amount of vanadium oxide contained in the catalyst. Additionally, the physical state of the vanadium oxide in the catalyst also affects the activity. Thus, for example, a catalyst wherein vanadium oxide is not uniformly distributed in and on the carrier is less active then one wherein the vanadium oxide is distributed more evenly on the carrier. For the purpose of increasing the amount of and of more uniformly distributing vanadium oxide on a suitable carrier and thus to improve the activity of the finished catalyst, resort to numerous methods has heretofore been made. However, no one of the known methods is considered to be eminently satisfactory from the point of view of providing high vanadium oxide content and uniform distribution thereof on a suitable carrier in a low cost, simple operation while at the same time not producing deleterious effects on the physical characteristics of the catalyst.

Thus, a standard method for incorporating a high level of vanadium oxide upon a suitable carrier such as alumina involves the formation of a metallic complex from a vanadate salt and an organic acid, e.g., oxalic acid. This method, however, suffers primarily because of the cost of the acid employed and the diffculty in effecting uniform vanadium oxide distribution.

Colloidal vanadium pentoxide solutions have also been used for the coating of carriers in order to obtain a catalyst for use in oxidation reactions. However, the carrier or support is usually one which is an inert refractory material such as tabular alumina, fused alumina, refractory silica, pumice, silica, sand, quartz, carborundum, asbestos, Fuller's earth, diatomaceous earth, clay and similar material. Such supports, since they of themselves possess little, if any, catalytic activity do not serve to allow the finished vanadium oxide catalyst to be used in numerous hydrocarbon conversion reactions but rather restrict their use to one or at most several very specific applications. A further disadvantage is found in the tedious procedure in the preparation of colloidal solutions of vanadium pentoxide. Still further, the amount of vanadium pentoxide deposited on such a carrier is limited and repetitive coating steps are usually necessary.

Impregnation of a suitable carrier with a solution of a vanadium salt such as vanadyl solfate, ammonium metavanadate, sodium metavanadate and certain oxyhalides has also been used as a standard procedure. Of these various salts, ammonium metavanadate has been the one of choice inasmuch as the introduction into the catalyst of sodium, halide, or sulfate ions is troublesome. These contaminating ions are not easily removed from the catalyst either by washing or by combustion. Ammonium metavanadate, however, is relatively insoluble in water except at high temperatures whereat decomposition usually takes place. Thus, the solubility of ammonium metavanadate in water at 20° C. is only 0.45%, at 40° C., 0.9%, at 70° C., 3.0%, at 100° C., 9.5% and at 120° C., 21.0% with decomposition. Because of the limited solubility of ammonium metavanadate in water, a single impregnation step of a suitable carrier with for example, a 7% solution of ammonium metavanadate introduces a maximum of only about 3 to 4% $V_2O_5$. Successive drying and reimpregnating steps are required in order to obtain a catalyst having $V_2O_5$ content of about 10% even when using high temperature impregnation. Of course, each subsequent impregnation step introduces a successively smaller amount of $V_2O_5$. Since a high level of $V_2O_5$, i.e. from about 5 to 25% of $V_2O_5$, is considered advantageous for many hydrocarbon conversion processes, it will be seen that an impregnation process employing a solution of ammonium metavanadate leaves much to be desired from the point of view of simplicity and economy in operation. Additionally, quite frequently, a catalyst of inferior physical strength is obtained when multiple impregnation steps are employed. Since ease of regenerability is preferred, such lower strength markedly effects the acceptability of a catalyst produced by such a method.

Coprecipitation of vanadium oxide with a suitable carrier, for example, alumina, silica and the like, has also been resorted to for the purpose of introducing large amounts of vanadium oxide in a uniform manner into a finished catalyst composition. Here, however, large volumes of solutions and reagents must be employed and extra processing steps are involved. Thus, the overall cost of the catalyst is markedly increased. Additionally, a carrier supported vanadium oxide catalyst obtained by coprecipitation techniques is usually inferior in physical strength in much the same manner as that obtained by a multiple impregnation method.

The use of solvents other than water for ammonium metavanadate in both the multiple impregnation and coprecipitation techniques has also been suggested for the purpose of introducing high levels of vanadium oxide in a uniform manner onto a suitable carrier. The cost of such solvents together with their sometimes hazardous properties, however, induces one to seek other methods for producing a vanadium oxide catalyst. In view of all of these hereinabove mentioned prior art methods for obtaining vanadium oxide catalysts, it appears highly desirable and advantageous to provide a process for preparing a vanadium oxide catalyst having a high content of vanadium oxide uniformly distributed throughout the catalyst which, because of its simplicity and economy, could be readily adopted to commercial plant procedures.

We have now discovered a process for preparing an alumina supported vanadium oxide catalyst which involves contacting a suitable active alumina base with an aqueous solution or slurry of ammonium metavanadate while eliminating and removing ammonia thereby to effect an interchange of ions upon and within the base. Because of such interchange, a catalyst having a high level of vanadium oxide uniformly distributed throughout is obtained after dewatering and calcination. Thus, apart from physical incorporation of NH₄VO₃ within the porous structure of the alumina support, a reaction on the surface of the alumina base also appears to take place according to the following equation:

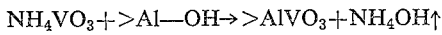

$$NH_4VO_3 + >Al\text{—}OH \rightarrow >AlVO_3 + NH_4OH\uparrow$$

In carrying out the process of the present invention, it is essential that an active alumina carrier or base which is characterized by a high surface area be employed. By high surface area alumina is meant one which possesses a surface area in excess of 75 m.²/gm. and preferably between 200 and 400 m.²/gm. Such type of an alumina is required in order that the reaction described in the equation hereinabove take place. In other words, the contacting of an alumina of high surface area with ammonium metavanadate as described above results in not only a deposition of ammonium metavanadate within the extremely porous structure of the base, but also ultimate association by way of chemical bonding which takes place at the surface of the alumina. It is because of this twofold manner of incorporation in and on an alumina carrier that both a high level of vanadium oxide and uniform distribution thereof may be achieved.

The surface area of the alumina base is, for the most part, controlled by the particular preparative method employed. Alumina of suitable activity for catalytic purposes is prepared by precipitation from a solution of an alkali metal aluminate such as sodium or potassium aluminate. If hydrated alumina prepared by precipitation procedures from alkali metal aluminate is spray dried, a light fluffy product of a surface area of at least 75 m.²/gm. and of low apparent density is obtained. Such a base material is eminently suited for use in the present invention and may be prepared in accordance with the procedure described in U.S. Patent No. 2,657,115, the subject matter of which is incorporated herein by reference.

It will be appreciated that converting a spray dried alumina to pellets or extrudates increases the density of the material considerably. Thus, a spray dried base having a bulk density of 0.2 to 0.5 g./cc. after pelletting or extrusion can have a substantially higher bulk density, e.g., about 0.5 to about 1.0 g./cc. depending upon the conditions employed.

Spray drying of the alumina may be accomplished by any suitable spray dryer. One that has been employed with success is described in U.S. Patent No. 2,644,516, dated July 7, 1953. Although gas inlet temperatures of up to 1300° F. may be employed, the temperature of the drying gases entering into the spray drying chamber is preferably controlled within the range of about 400 to 1000° F. so that the catalyst material is converted into set partially dehydrated microspheroidal gel-like particles. Spray drying of alumina hydrate usually results in a moisture content of from between 15–30% in the spray dried product.

While it is not absolutely essential to the process of the present invention that an alumina of a type other than that characterized by a surface area such as that defined hereinabove be employed, it is preferable to use an alumina which has been stabilized by the addition thereto of a minor proportion of silica, that is from 1 to 20%, which serves to render the catalyst markedly more heat stable and to improve the mechanical strength of the finished catalyst upon calcination and thereby to prolong the active life of the catalyst.

While an active alumina of the type produced by the method of U.S. Patent No. 2,657,115, as mentioned hereinbefore, is advantageously employed in the process of this invention many other commercially available aluminas conforming, of course, to the critical specification of surface area are equally suitable and capable of utilization. Thus, for example, such active aluminas as those manufactured and marketed by Kaiser Aluminum and Chemical Sales, Inc., and by Aluminum Company of America may also be used in the present process. These aluminas are sold under the trade designation of Kaiser KA–101 (surface area=360 m.²/gm.; 0.02% SiO₂) and Alcoa Activated Alumina H–151 (surface area=350 m.²/gm.; 6.3% SiO₂).

The alumina characterized by a surface area of at least 75 m.²/gm. to be contacted with or treated with the ammonium metavanadate may be in the form of compressed tablets, extrudates, powder, granules, microspheres, beads or the like which may range in size in average diameter of from about .0035 to .35″. The carrier is normally shaped into such physical form after its preparation by any of the well known methods such as precipitation of an alkali metal aluminate. Where a silica stabilized alumina is desirable it may be obtained by coprecipitation of an alkali metal aluminate with an alkali metal silicate by the addition of an alkali metal carbonate or an acid such as sulfuric acid, nitric acid and the like or by physically mixing SiO₂–Al₂O₃ with Al₂O₃ hydrogel and aging to effect chemical reaction and achieve intimate SiO₂ distribution. The alumina carrier is then formed into the desired shape by well known methods and is then activated by drying and calcination at a temperature of from 200–800° C. However, regardless of the physical form or shape of the carrier, it is essential that the carrier be characterized by a minimum surface area of 75 m.²/gm. and preferably higher.

If a spray dried alumina powder is employed as the carrier, it is desirable that such active alumina, in addition to being of high surface area, be also characterized by a low apparent bulk density, i.e. from about 0.2 to about 0.5 g./cc. Bulk density as described herein is measured by slowly pouring the alumina into a 100 ml. graduated cylinder, density being given as weight per unit volume.

While the process of the present invention is especially applicable to the preparation of an activated alumina supported vanadium oxide catalyst, it is also contemplated to employ the process in the preparation of catalysts wherein components other than alumina and vanadium oxide and, in some instances, silica are also present. Such components include but are not limited to noble metals such as palladium, platinum and the like; metallic oxides of the iron series such as iron oxide, cobalt oxide, nickel oxide and the like; and the various other metallic oxides such as copper oxide, magnesium oxide and the like.

A saturated ammonium metavanadate solution prior to admixture with alumina is at a pH of approximately 6.6 to 6.8. However, that physical deposition alone is not involved and that a chemical reaction takes place in the present process is evidenced by the evolution of ammonia from the reaction mixture and a rather rapid rise of pH to approximately 8.0 where it would appear that the solution is buffered by the presence therein of aluminum hydroxide. When the maximum amount of ammonium metavanadate has been adsorbed onto the alumina, the pH of the reaction mixture then begins to fall. Such change in the pH of the system affords an easy method of determining the end point of the process.

It has been found that the process of the present invention may be carried out using either an aqueous solution or slurry of ammonium metavanadate. In either case, however, it is essential that the ammonia which is liberated during the contacting of ammonium metavanadate with the active alumina be removed in order to effect the surface reaction described hereinbefore and to produce the alumina vanadate composite which is subsequently dried and calcined. One embodiment of the present invention, i.e., the use of an aqueous saturated solution of ammonium metavanadate is especially adaptable for the contacting of active alumina particles while the same are maintained as a packed column within a suitable vessel. In this procedure, the solution is allowed to pass through the alumina column and the ammonia liberated is removed in solution form as ammonium hydroxide by withdrawal of the solution from which vanadate ion has been leached. The alternative embodiment, i.e., the use of an aqueous ammonium metavanadate slurry, is particularly suitable for contacting active alumina partices at usually higher temperatures, e.g., from about 30° C. to about 110° C., preferably from about 60° to about 110° C., whereat the liberated ammonia is removed in the form of its vapors.

The concentration of ammonium metavanadate in water is dependent primarily on the temperature at which the process is carried out and will therefore usually be in the range of from at least 0.7% at 30° C. to at least 9.5% at 100° C. Thus, the impregnating solution contains the equivalent of from about 0.55 to 7.4 grams of $V_2O_5$ per 100 ml. of solution. A saturated solution may be readily prepared by merely slurrying the desired amount of ammonium metavanadate into a suitable vessel containing water. If the slurry technique is employed, the concentration of ammonium metavanadate will, of course, be in excess of that found to be necessary when the alternative solution method is used.

Following the contacting of the carrier with the aqueous solution or slurry of ammonium metavanadate, the vanadium salt within the alumina pores as well as the surface complex $>AlVO_3$ is decomposed to $V_2O_5$ upon heating either in an inert atmosphere or in the presence of oxygen after dewatering. Following such decomposition, the alumina vanadate composite, if in powder form, may be pelleted by employing conventional pelleting equipment or extruded by employing known extrusion techniques and be further dried and calcined by heating at a temperature from about 500 to about 1500° F. for 2 to 24 hours.

The invention will be further clarified by reference to the following examples which are to be construed only as illustrative and are not to be taken as limiting it thereto.

*Example 1*

A heel of water was placed in a suitable strike tank, the agitator started and stoichiometrical equivalent quantities of soduim aluminate (29% $Al_2O_3$) and aluminum sulfate (commercial alum) added, together with a sufficient amount of water, to maintain the solids level at about 7% and a pH level of about 9. The pH of the resulting slurry was adjusted to about 7 and the slurry aged for about one-half hour. The slurry was then filtered twice and the filtrate washed to reduce sulfate and sodium ions below acceptable levels.

Thereafter the washed filter cake was injected through stationary nozzles into a descending rotating column of gas having an inlet temperature of from about 600°–700° F. and an outlet temperature of about 250° F. and thereby dried to a heat set gel having a moisture content of about 20–25% as measured by loss on ignition at 1100° F.

The spray dried alumina gel is characterized by a surface area of 300 m.$^2$/gm. and a bulk density of about 0.2 g./cc.

*Example 2*

Relative proportions of one and one half parts of a spray dried alumina, prepared as in Example 1, were mulled with 1 part of washed filter cake as described therein, with 2% of graphite as a lubricant, and extruded into $\frac{1}{16}''$ x $\frac{3}{16}''$ particles. The extrudates were dried and then calcined at 1100° F. for 1 hour. These were characterized by a bulk density of 0.56 g./cc.

*Example 3*

A portion of the alumina filter cake obtained in Example 1 is blended with silica-alumina hydrogel containing 13% $Al_2O_3$ on an ignited basis in amounts sufficient to give an alumina containing 2% $SiO_2$. The mixture after aging for one hour was injected through stationary nozzles into a descending rotating column of gas having an inlet temperature of from about 600–700° F. and an outlet temperature of about 250° F. and thereby dried to a heat set gel.

The spray dried silica stabilized alumina gel is characterized by a surface area after calcination at 1100° F. of about 300 m.$^2$/gm.

*Example 4*

One hundred and thirty-one grams of $\frac{1}{16}''$ alumina beads, surface area of 293 m.$^2$/gm. and bulk density of 0.62 g./cc., prepared from the extrudates of Example 2, were impregnated seven times at 90° C. with a saturated solution of $NH_4VO_3$ using the following cycle:

(1) Add enough hot solution to beads to saturate the pores;
(2) Place in 1100° F. calciner for 20 minutes and remove;
(3) Let cool to ambient temperature for 15 minutes.

The amount of $V_2O_5$ deposited on the alumina at the termination of each cycle is as follows:

PERCENT $V_2O_5$ AT END OF IMPREGNATION

| No. | 1 | 2 | 3 | 4 | 5 | 6 | 7 |
|---|---|---|---|---|---|---|---|
| Percent | 3.0 | 4.8 | 6.2 | 7.2 | 7.9 | 8.5 | 9.0 |

The calcined product contained 9% $V_2O_5$.

*Example 5*

A basket containing 16 lbs. of $\frac{1}{16}''$ alumina beads, surface area of 293 m.$^2$/gm. and bulk density of 0.62 g./cc., prepared in accordance with Example 3, was immersed in an open vessel containing a water slurry of ammonium metavanadate (4 lbs. $NH_4VO_3$ in 30 lbs. of $H_2O$) at 75° C. The temperature of the slurry was raised to 95–100° C. and maintained thereat for 1½ hours. The beads were agitated by moving the basket occasionally during this period. The basket was removed from the slurry and the alumina vanadate composite was allowed to drain. The alumina vanadate composite was dried overnight at 250° F. and then calcined at 1100° F. for one hour The dried product contained 10.1% $V_2O_5$.

*Example 6*

The following materials in an open container were charged to a tray drier set for 250° F.:
120 lbs. water
7 lbs. ammonium metavanadate
48 lbs. $\frac{1}{16}''$ alumina extrudates, surface area of 210 m.$^2$/gm. and bulk density of 0.56 g./cc., as prepared in Example 2 and the mixture dried overnight. Additional water was then added to cover the catalyst and the drying repeated.

The alumina vanadate composite was calcined at 1100° F. and upon analysis the thus produced catalyst was found to contain 8% $V_2O_5$. To obtain a higher $V_2O_5$ level, this material was tray dried with an additional quantity of an ammonium metavanadate slurry and calcined to give a final product having 13% $V_2O_5$.

*Example 7*

Seventy-seven grams of alumina extrudates prepared as in Example 2 were heated overnight in an open container in an oven at 240° F. with 1 liter of $NH_4VO_3$ water slurry containing 150 g. $NH_4VO_3$. Water was added and the mix again evaporated to dryness. Excess ammonium metavanadate was then removed by a washing prior to final drying and calcination for 1 hour at 1100° F. The final product contained 9% $V_2O_5$, and was characterized by a bulk density of .67 g./cc.

Example 8

Two hundred grams of Alcoa H-151 activated alumina spheres (⅛″ diameter) were mixed with 2300 grams of a water slurry of ammonium metavanadate (150 g./liter). The mixture was heated in a 220° F. oven to effect surface reaction of vanadia with alumina by the reaction:

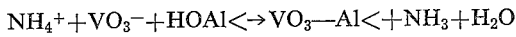

After twice evaporating to dryness, the alumina spheres were lightly washed to remove uncombined vanadia. The product was calcined for one hour at 1100° F.

On analysis for $V_2O_5$, the product was found to contain 10% $V_2O_5$.

Example 9

A 100 cc. buret was packed with calcined ¹⁄₁₆″ alumina extrudates of Example 2, surface area 210 m.²/gm. and bulk density 0.60 g./cc. An ammonium metavandate solution saturated at 32° C. was prepared. The solution was passed through the packed buret at the rate of 10 cc./min. The pH of the solution as it left the column was 8.0 An ammonia odor from the solution was detected. Passage of solution was terminated when the pH fell below 8.

The product was removed from the buret, dried at 250° F. overnight, and subsequently calcined for 1 hour at 1100° F.

The calcined catalyst contained 5.7% $V_2O_5$ by weight.

Example 10

A slurry of 115 grams ammonium metavanadate and 160 grams of water was heated to 60° C. One hundred and eighty-four grams of oxalic acid was added slowly over a period of 15 minutes. After the evolution of carbon dioxide gas had ceased, 42 g. of a 28% ammonium hydroxide solution was added maintaining the solution at 50° C.

This "solution" was added to 657 grams of Alcoa H-151 activated alumina spheres (⅛″ diameter). The alumina and "solution" were aged for a period of 48 hours. The resultant catalyst was washed lightly to remove uncombined vanadia. The catalyst was calcined in a muffle furnace for four hours at 660° F.

The final product contained 8% $V_2O_5$.

Example 11

The procedure of Example 5 was repeated. However, prior to the final calcination step, 22 lbs. of the finished dried material were impregnated to a pore saturation end point with a solution prepared by diluting with water 101 g. $PdCl_2$ solution (1% Pd) and 97 g. $Cu(NO_3)_2 \cdot 3H_2O$ to 4610 cc.

The impregnated product was dried overnight at 250° F. and subsequently calcined for two hours at 1100° F.

The final product had the following composition:

| | Percent |
|---|---|
| $SiO_2$ | 2 |
| $V_2O_5$ | 10 |
| CuO | 3 |
| Pd | .01 |
| $Al_2O_3$ | 85 |

For the purpose of rating the performance of the catalysts prepared in accordance with the process of the present invention, their activity in oxidizing hydrocarbons contained in the exhaust resulting from the operation of five H.P. four cycles 5/1 compression ratio engine operating under idling conditions and employing a leaded hydrocarbon fuel was determined. The results of this series of tests of catalysts prepared not only by the method of the present invention but also by several prior art methods are shown in the following table:

| Method of preparation | Example 4 (Multiple impregnation) | Example 5 (Boiling slurry) | Example 6 (Tray drier ion exchange slurry) | Example 9 (Column ion exchange solution) | Example 10 (Oxalate complex) | Example 11 (Boiling slurry plus pore saturation impregnation) |
|---|---|---|---|---|---|---|
| Code | 4473-101 | 4633-129 | 4315-33 | 4123-147 | 3894-179 | 4633-132 |
| Percent $V_2O_5$ | 9.0 | 10.1 | 13.0 | 5.7 | 8.0 | 9.8 |
| Bulk density | 0.78 | 0.74 | 0.64 | 0.65 | 0.93 | 0.76 |
| Percent $C_3H_6$ removed, 400° C. | 70 | 75 | 75 | 53 | 50 | 82 (270° C.) |
| Percent $C_2H_4$ removed, 325° C. | 38 | 39 | 48 | 32 | 25 | 92 (320° C.) |
| Percent total hydrocarbons removed from exhaust, 325° C., 10% added air | 18 | 20 | 39 | | | 65 |
| Percent total hydrocarbons removed from exhaust, 400° C., 10% added air | 49 | 58 | 60 | 52 | 52 | |

It will be noted from the data hereinabove that an alumina vanadium oxide catalyst prepared by either the multiple impregnation process or the oxalate complex process is inferior to a catalyst prepared by the "slurry" process of the present invention with respect to removal of $C_3H_6$ and $C_2H_4$ hydrocarbons from engine exhaust gases at 325° and 400° C. Similarly, an alternative method of preparation, i.e., "column ion exchange" produces a catalyst which is superior to the catalyst prepared by the oxalate complex method in the removal of $C_3H_6$ hydrocarbons and $C_2H_4$ hydrocarbons. Further, the "slurry" method of the present invention, that is, the process as described in Examples 5 and 6, affords a catalyst which is effective in the removal of approximately 20% more total hydrocarbons from exhaust at 400° C. than a catalyst prepared by a multiple impregnation method.

Finally, by way of comparison, the effectiveness of a catalyst prepared in accordance with the present invention containing not only activated alumina and vanadium oxide but also palladium and copper oxide is also shown in the table hereinabove. The inclusion of the test results for this particular catalyst is for the purpose of showing that other catalytically active materials may be incorporated in and on the alumina vanadium oxide base to improve the overall activity thereof.

While the foregoing invention has been described in conjunction with certain preferred embodiments, it is to be understood that numerous other modifications may be made in the process herein without departing from the scope of the invention. Consequently, the invention is to be constructed broadly and is to be restricted only by the appended claims.

We claim:

1. A process for preparing alumina supported vanadium oxide catalyst which comprises: (1) adjusting the temperature of an aqueous slurry of ammonium metavanadate to a reaction-temperature from about 30° C. to about 110° C.; (2) contacting and thereby reacting said slurry with activated alumina particles while simultaneously maintaining substantially said reaction-temperature, said contacting and reacting being for a time sufficient to form a reaction mixture and being for a time sufficient to liberate ammonia, said maintaned reaction-temperature being for a time sufficient (a) to remove said ammonia from said reaction mixture, (b) to thereby effect a surface reaction of vanadate ion with said alumina forming alumina vanadate, and (c) to thereby substantially simultaneously cause pH of said contacting slurry to fall below about 8.0; (3) subsequently dewatering said alumina vanadate reaction composite; and (4) calcining said dewatered composite.

2. A process for preparing an alumina supported vanadium oxide catalyst which comprises: (1) forming an aqueous slurry of ammonium metavanadate; (2) admixing with said slurry, activated alumina particles thereby forming a reaction mixture; (3) heating said reaction mixture to a temperature between 60° C. and 110° C. for a time (a) sufficient to cause an interchange of vanadate ions with hydroxyl ions to take place on the surface of said alumina particles, (b) sufficient to cause ammonia to be evolved, and (c) sufficient to thereby substantially simultaneously cause pH of said reaction mixture to fall below about 8.0; (4) removing said ammonia; (5) subsequently withdrawing said alumina and the resultant alumina vanadate composite from the reaction mixture, (6) drying, and (7) subsequently calcining said composite.

3. A process for preparing an alumina supported vanadium oxide catalyst which comprises: (1) forming an aqueous slurry of ammonium metavanadate; (2) admixing with said slurry, activated alumina particles having a surface area of at least 75 m.$^2$/gm. and stabilized with a minor portion of silica, thereby forming a reaction mixture; (3) heating said reaction mixture to a temperature between about 95° C. and 100° C. for at least 1.5 hours, said heating being maintained sufficiently and for a time sufficiently (a) to cause an interchange of vanadate ions with hydroxyl ions to take place on the surface of the alumina particles, (b) to cause ammonia to be evolved, (c) to thereby substantially simultaneously cause pH of said reaction mixture to fall below about 8.0; (4) removing said ammonia; (5) subsequently withdrawing said alumina and the resultant alumina vanadate composite from the rection mixture, (6) drying, and (7) subsequently calcining said composite.

4. A process for preparing an alumina supported vanadium oxide which comprises: (1) adjusting the temperature of an aqueous solution of ammonium metavanadate to a reaction-temperature of from about 30° C. to about 110° C.; (2) contacting and thereby reacting said solution with activated alumina particles while simultaneously maintaining substantially said reaction-temperature, said contacting and reacting being for a time (a) sufficient to form an alumina vanadate composite and (b) sufficient to cause ammonia to be evolved; (3) removing said ammonia sufficiently to substantially simultaneously cause pH of the contacting solution to fall below about 8.0; (4) isolating said alumina vanadate composite from said solution when the pH of said contacting-solution falls to below about 8.0; and (5) calcining said isolated alumina vanadate composite.

5. A catalyst for use in hydrocarbon conversion processes prepared by a process comprising: (1) adjusting the temperature of an aqueous slurry of ammonium metavanadate to a reaction-temperature from about 30° C. to about 110° C.; (2) contacting and thereby reacting said slurry with activated alumina particles while simultaneously maintaining substantially said reaction-temperature, said contacting and reacting being for a time (a) sufficient to form a reaction mixture and (b) sufficient to liberate ammonia, said maintained reaction-temperature being sufficient (a) to remove said ammonia from said reaction mixture (b) to thereby effect a surface reaction of vanadate ion with said alumina forming alumina vanadate, and (c) to thereby substantially simultaneously cause pH of said reacting slurry to fall below about 8.0; (3) subsequently dewatering said alumina vanadate reaction composite; and (4) calcining said dewatered composite.

6. A process for preparing an alumina supported vanadium catalyst which comprises: (1) forming an aqueous slurry of ammonium metavanadate; (2) admixing with said slurry, activated alumina particles having a surface area of at least 75 m.$^2$/gm., thereby forming a reaction mixture; (3) heating said reaction mixture to a temperature between 60° C. and 110° C. for a time (a) sufficient to cause an interchange of vanadate ions with hydroxyl ions to take place on the surface of said alumina particles, (b) sufficient to cause ammonia to be evolved, and (c) sufficient to thereby substantially simultaneously cause pH of said reaction mixture to fall below about 8.0; (4) removing said ammonia; (5) subsequently withdrawing said alumina and the resultant alumina vanadate composite from the reaction mixture, (6) drying, and (7) subsequently calcining said composite.

7. A process for preparing an alumina supported vanadium oxide which comprises: (1) adjusting the temperature of an aqueous solution of ammonium metavanadate to a reaction-temperature of from about 30° C. to about 110° C.; (2) contacting and thereby reacting said solution with activated alumina particles having a surface area of at least 75 m.$^2$/gm. while simultaneously maintaining substantially said reaction-temperature, said contacting and reacting being for a time (a) sufficient to form an alumina vanadate composite and (b) sufficient to cause ammonia to be evolved; (3) removing said ammonia sufficiently to substantially simultaneously cause pH of the contacting solution to fall below about 8.0; (4) isolating said alumina vanadate composite from said solution when the pH of said contacting-solution falls to below about 8.0; and (5) calcining said isolated alumina vanadate composite.

8. A process for preparing an alumina supported vanadium oxide which comprises: (1) adjusting the temperature of an aqueous solution of ammonium metavanadate to a reaction-temperature of from about 30° C. to about 110° C.; (2) contacting and thereby reacting said solution with activated alumina particles (a) having a surface area of at least 75 m.$^2$/gm. and (b) being stabilized by a minor proportion of silica while simultaneously maintaining substantially said reaction-temperature, said contacting and reacting being for a time (a) sufficient to form an alumina vanadate composite and (b) sufficient to cause ammonia to be evolved; (3) removing said ammonia sufficiently to substantially simultaneously cause pH of the contacting solution to fall below about 8.0; (4) isolating said alumina vanadate composite from said solution when the pH of said contacting-solution falls to below about 8.0; and (5) calcining said isolated alumina vanadate composite.

9. A process for preparing an alumina supported vanadium oxide catalyst which comprises adjusting the temperature of an aqueous solution of ammonium metavanadate to a reaction-temperature of from about 30° C. to about 110° C.; (2) contacting and thereby reacting said solution with activated alumina particles while simultaneously maintaining substantially said reaction-temperature, said contacting and reacting comprising passing said solution through a column containing said activated alumina particles sufficiently to form an alumina vanadate composite and sufficiently to cause ammonia to be evolved; (3) removing said ammonia sufficiently to substantially simultaneously cause pH of the contacting solution to fall below about 8.0; (4) isolating said alumina vanadate composite from said solution when the pH of said contacting solution falls below about 8.0; and (5) calcining said isolated alumina vanadate composite.

References Cited by the Examiner
UNITED STATES PATENTS

| | | | |
|---|---|---|---|
| 2,485,073 | 10/49 | Shiffler et al. | 252—464 |
| 2,510,803 | 6/50 | Cooper | 252—464 |
| 2,785,144 | 3/57 | Fleck | 252—464 |
| 2,817,626 | 12/57 | Mabry et al. | 252—464 X |
| 2,839,535 | 6/58 | Hadley et al. | 252—464 X |
| 2,912,300 | 11/59 | Cannon et al. | 252—464 X |
| 3,011,980 | 12/61 | Bell | 252—464 |
| 3,025,132 | 3/62 | Innes | 252—464 X |

MAURICE A. BRINDISI, *Primary Examiner.*

UNITED STATES PATENT OFFICE
CERTIFICATE OF CORRECTION

Patent No. 3,207,703

September 21, 1965

William B. Innes et al.

It is hereby certified that error appears in the above numbered patent requiring correction and that the said Letters Patent should read as corrected below.

Column 2, line 12, for "solfate" read -- sulfate --; column 5, line 12, for "partices" read -- particles --; line 48, for "soduim" read -- sodium --; column 6, line 40, strike out "of"; columns 7 and 8, in the table, first column, line 4 thereof, for "400° C." read -- 325° C. --; same table, same column, line 5 thereof, for "325° C." read -- 400° C. --; column 8, line 70, for "constructed" read -- construed --; column 9, line 7, for "maintaned" read -- maintained --.

Signed and sealed this 14th day of June 1966.

(SEAL)
Attest:

ERNEST W. SWIDER
Attesting Officer

EDWARD J. BRENNER
Commissioner of Patents